UNITED STATES PATENT OFFICE.

FRIEDRICH ERNST FERDINAND NEUMANN, OF WANDSBEK, NEAR HAMBURG, GERMANY.

METHOD OF PRODUCING COCOA POWDER.

998,113. Specification of Letters Patent. Patented July 18, 1911.

No Drawing. Application filed January 4, 1910. Serial No. 536,408.

*To all whom it may concern:*

Be it known that I, FRIEDRICH ERNST FERDINAND NEUMANN, a subject of the King of Prussia, and resident of Wandsbek, near Hamburg, Germany, have invented a new and useful Method of Producing Cocoa Powder, of which the following is a specification.

The methods for producing cocoa-powder known heretofore have the disadvantage that the development of taste and aroma, due to the roasting of the cocoa-beans or kernels together with the treating of the intermediate products with alkalis proceeds far too quickly and intensely, as to enable these properties to become discernible in a sufficient and agreeable manner in the final product.

The present invention has for its object to do away with this disadvantage and to preserve and strongly develop the peculiarities of the cocoa-beans with regard to taste and aroma in the final product as much as possible. With this object in view it is above all necessary, that the raw cocoa beans, no matter whether they are unprepared or prepared with alkalis, are not subjected to a roasting, but merely to a drying process at a temperature of 50 to 120° C.
depending on the place of growth and on the nature of the beans, the heat being preferably applied gradually rising. Hereupon the dried but unroasted beans are broken, unshelled or hulled and the cocoa fragments, thus produced, thoroughly cleaned. These fragments may now be ground to a coarse meal or to a mass of melted pasty like or fine consistency. The powder or mass, as the case may be, can then be prepared by subjecting it to the action of alkalis or, if desired, may be left unprepared. The powder or mass prepared or not is in a condition to be operated on by such procedure, which is necessary to further develop the dried constituents which create the desired pleasant taste and aroma. Such procedure consists in working the powder or mass by subjecting it to a mixing, kneading, beating, pressing, and fulling, in which the material is thoroughly mashed and all particles repeatedly exposed to the air and give off their moisture. This procedure which is hereinafter termed working is carried out by well known means such as rolls, edge-mills, rollers, pounding rams or other suitable means arranged in boxes or other receptacles, in which the unroasted mass is thoroughly working at a temperature of 35 to 100° C. to prevent roasting uninterruptedly for hours or even for days, both temperature and length of time depending on the character of the raw material. In case the material was in condition of a powder it will be turned into a pasty mass by this treatment. When this working is finished the mass may be further operated on in any known manner, that is to say, it may be pressed to expel any desired amount of fat or butter forming a more or less solid cocoa-body, which can be ground and sifted to cocoa-powder. However it is of greater advantage to subject the powder or mass to the aroma- or taste-generating working not immediately after its production or after treatment with alkali, but first to give it a preliminary partly pressing so as to expel a certain amount of fat or oil.

The operation in this case is carried on as follows: The coarse powder or mass either coarsely or finely ground is first pressed to remove so much of the oil or fat as may be dispensed with for obtaining a kneadable mass. This done the press-body or cake is ground to a coarse powder and then mashed at a suitable temperature to a kneadable mass in a melangeur or similar machine. In this condition the mass can be rolled or rubbed according to need, whereupon it is brought into boxes or receptacles, in which it is operated upon by rolls, edge-mills, rollers, pounding rams or other suitable devices and in which according to the character of the raw-material the mass is uninterruptedly worked at a temperature from 35 to 100° C. to prevent roasting for hours or for days depending also on the character of the raw material. The mass then may be formed into a press-body or cake by depriving it of its fat to any degree as may be found desirable and then formed into cocoa-powder by grinding and sifting.

The cocoa beans which may be treated with alkalis in the usual manner are dried at a temperature of from 50° to 120° C., the heat being preferably caused to rise. By this operation the husks or shells are loosened, which thereupon are expelled in the usual manner by the aid of known machines. The cocoa kernel or fragments are now ground to a coarse meal and then partly deprived of their oil or fat by pressing in a known press box. The mass thus obtained is subjected to the action of rolls or pounding rams or the like, at a temperature of from 35° to 100° C., uninterrupted for a certain time, the length of time depending on the character of the material.

I claim:

1. The method of producing cocoa-powder, which comprises drying cocoa-beans at a temperature varying from 50 to 120 degrees C., hulling the dried beans, grinding the kernels to meal and working the meal at a temperature varying from 35 to 100 degrees C. for hours or days according to the nature of the raw beans.

2. The method of producing cocoa-powder, which comprises drying cocoa beans at a temperature varying from 50 to 120 degrees C., hulling the dried beans, grinding the kernels to a coarse meal, and working the meal at a temperature varying from 35 to 100 degrees C. for hours or days according to the nature of the raw beans.

3. The method of producing cocoa-powder, which comprises drying cocoa-beans at a temperature varying from 50 to 120 degrees C. hulling the dried beans, grinding the kernels to meal, subjecting the meal to the action of alkalis, working the treated meal at a temperature varying from 35 to 100 degrees C. for hours or days according to the nature of the raw beans.

4. The method of producing cocoa-powder, which comprises drying cocoa-beans at a temperature varying from 50 to 120 degrees C., hulling the dried beans, grinding the kernels to meal, pressing the meal to expel the desired amount of fat, and working the meal at a temperature varying from 35 to 100 degrees C., for hours or days, according to the nature of the raw beans.

5. The method of producing cocoa-powder, which comprises drying the cocoa-beans by subjecting them to a temperature varying from 50 to 150 degrees C., hulling the dried beans, grinding the kernels to a coarse meal, working the meal at a temperature varying from 35 to 100 degrees C. for hours or days according to the nature of the raw beans, and pressing the worked mass to expel any desired amount of fat, thereby forming a more or less solid cocoa-body.

6. The method of producing cocoa-powder, which comprises drying the cocoa-beans by subjecting them to a temperature varying from 50 to 120 degrees C., hulling the dried beans, expelling the hulls, grinding the dried kernels to a meal, pressing the meal to deprive it of a portion of its oil, working the pressed mass at a temperature varying from 35 to 100 degrees C., for hours or days according to the nature of the raw beans, pressing the worked mass, and grinding and sifting the latter to form a powder.

7. The method of producing cocoa-powder, which comprises drying the cocoa-beans by subjecting them to a temperature varying from 50 to 120 degrees C., hulling the dried beans, expelling the hulls, grinding the dried kernels to a meal, subjecting the meal to the action of alkalis, pressing the meal to deprive it of a portion of its oil, working the pressed mass at a temperature varying from 35 to 100 degrees C., for hours or days according to the nature of the raw beans, pressing the worked mass, and grinding and sifting the latter to form a powder.

8. The method of producing cocoa-powder, which comprises drying cocoa beans at a temperature below roasting temperature, hulling the dried beans, grinding the kernels, and working the ground material at a temperature below roasting temperature for hours or days according to the nature of the raw beans.

FRIEDRICH ERNST FERDINAND NEUMANN.

Witnesses:
CHARLES HARRY ROECKNER,
ERNEST H. L. MUMMENHOFF.